(12) United States Patent
Bartik et al.

(10) Patent No.: US 8,516,227 B2
(45) Date of Patent: *Aug. 20, 2013

(54) SET PROGRAM PARAMETER INSTRUCTION

(75) Inventors: Jane H. Bartik, Poughkeepsie, NY (US); Lisa C. Heller, Rhinebeck, NY (US); Damian L. Osisek, Vestal, NY (US); Donald W. Schmidt, Stone Ridge, NY (US); Patrick M. West, Jr., Hyde Park, NY (US); Phil C. Yeh, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 159 days.

This patent is subject to a terminal disclaimer.

(21) Appl. No.: 12/961,929

(22) Filed: Dec. 7, 2010

(65) Prior Publication Data

US 2011/0078419 A1 Mar. 31, 2011

Related U.S. Application Data

(63) Continuation of application No. 12/901,805, filed on Oct. 11, 2010, which is a continuation of application No. 12/244,300, filed on Oct. 2, 2008, now Pat. No. 7,827,321.

(51) Int. Cl.
| | |
|---|---|
| *G06F 12/02* | (2006.01) |
| *G06F 15/00* | (2006.01) |
| *G06F 15/76* | (2006.01) |
| *G06F 9/30* | (2006.01) |
| *G06F 9/40* | (2006.01) |

(52) U.S. Cl.
USPC .................. 712/208; 710/5; 712/5; 712/216

(58) Field of Classification Search
None
See application file for complete search history.

(56) References Cited

U.S. PATENT DOCUMENTS

| 4,843,541 A | 6/1989 | Bean et al. |
| 5,621,912 A | 4/1997 | Borruso et al. |
| 5,809,450 A * | 9/1998 | Chrysos et al. ............... 702/186 |

(Continued)

FOREIGN PATENT DOCUMENTS

| JP | 4001834 A | 1/1992 |
| JP | 2008027306 A | 2/2008 |
| KR | 1020050016917 A | 2/2005 |
| KR | 20060097597 | 9/2006 |

OTHER PUBLICATIONS

Kuester, F. et al., "Visualization of Particle Traces in Virtual Environments," VRST'01, Nov. 15-17, 2001, pp. 151-157.

(Continued)

*Primary Examiner* — Kris Rhu
(74) *Attorney, Agent, or Firm* — John E. Campbell; Blanche E. Schiller, Esq.; Heslin Rothenberg Farley & Mesiti P.C.

(57) ABSTRACT

A measurement sampling facility takes snapshots of the central processing unit (CPU) on which it is executing at specified sampling intervals to collect data relating to tasks executing on the CPU. The collected data is stored in a buffer, and at selected times, an interrupt is provided to remove data from the buffer to enable reuse thereof. The interrupt is not taken after each sample, but in sufficient time to remove the data and minimize data loss.

20 Claims, 13 Drawing Sheets

(56) References Cited

U.S. PATENT DOCUMENTS

| | | | |
|---|---|---|---|
| 6,023,759 A * | 2/2000 | Omtzigt | 712/227 |
| 6,119,075 A * | 9/2000 | Dean et al. | 702/186 |
| 6,195,730 B1 | 2/2001 | West | |
| 6,345,324 B1 | 2/2002 | Baskey et al. | |
| 6,347,341 B1 | 2/2002 | Glassen et al. | |
| 6,539,502 B1 * | 3/2003 | Davidson et al. | 714/47.1 |
| 6,574,727 B1 * | 6/2003 | Davidson et al. | 712/227 |
| 6,954,923 B1 * | 10/2005 | Yates et al. | 717/130 |
| 6,976,083 B1 | 12/2005 | Baskey et al. | |
| 6,983,303 B2 | 1/2006 | Pellegrino et al. | |
| 7,321,965 B2 * | 1/2008 | Kissell | 712/229 |
| 7,353,369 B1 * | 4/2008 | Coon et al. | 712/234 |
| 7,412,492 B1 | 8/2008 | Waldspurger | |
| 7,478,180 B1 | 1/2009 | Li | |
| 7,620,938 B2 | 11/2009 | Edwards et al. | |
| 7,624,240 B1 | 11/2009 | Colbert et al. | |
| 7,644,302 B2 | 1/2010 | Kambara et al. | |
| 7,827,321 B2 | 11/2010 | Bartik et al. | |
| 7,925,862 B2 * | 4/2011 | Moyer et al. | 712/34 |
| 2004/0111547 A1 | 6/2004 | Arimilli et al. | |
| 2005/0223180 A1 | 10/2005 | Derbeko | |
| 2006/0085794 A1 | 4/2006 | Yokoyama | |
| 2006/0200663 A1 | 9/2006 | Thornton | |
| 2006/0206892 A1 | 9/2006 | Vega et al. | |
| 2006/0236067 A1 | 10/2006 | Attinella et al. | |
| 2007/0101070 A1 | 5/2007 | Matsunami et al. | |
| 2007/0214380 A1 | 9/2007 | Rothman et al. | |
| 2008/0022032 A1 | 1/2008 | Nicholas et al. | |
| 2008/0147887 A1 | 6/2008 | Friemuth et al. | |
| 2008/0148015 A1 | 6/2008 | Takamoto et al. | |
| 2008/0155153 A1 | 6/2008 | Yoshii et al. | |
| 2008/0208927 A1 | 8/2008 | Chikusa et al. | |
| 2008/0295095 A1 | 11/2008 | Watanabe et al. | |
| 2009/0178036 A1 | 7/2009 | Levine | |
| 2010/0005464 A1 | 1/2010 | Malyugin et al. | |
| 2010/0036850 A1 | 2/2010 | Garman et al. | |
| 2010/0088771 A1 | 4/2010 | Heller et al. | |
| 2011/0029758 A1 | 2/2011 | Bartik et al. | |

OTHER PUBLICATIONS

Nagarajan, A. et al., "Proactive Fault Tolerance for HPC with Xen Virtualization," ICS'07, Jun. 18-20, 2007, pp. 23-32.
"z/Architecture—Principles of Operation," IBM Publication No. SA22-7832-06, Seventh Edition, Feb. 2008.
Bartik, Jane H. et al., "Query Sampling Information Instruction," U.S. Appl. No. 12/961,651, filed Dec. 7, 2010.
Office Action for U.S. Appl. No. 12/961,651 dated Aug. 25, 2011.
Final Office Action for U.S. Appl. No. 12/244,496 dated Jul. 11, 2012.
Office Action for U.S. Appl. No. 12/244,496 dated Dec. 7, 2011.

* cited by examiner

SET PROGRAM PARAMETER INSTRUCTION

This application is a continuation of U.S. Ser. No. 12/901,805, entitled "Set Sampling Controls Instruction," filed Oct. 11, 2010, which is a continuation of U.S. application Ser. No. 12/244,300 filed Oct. 2, 2008 now U.S. Pat. No. 7,827,321, entitled "Central Processing Unit Measurement Facility," issued Nov. 2, 2010, each of which is hereby incorporated herein by reference in its entirety.

BACKGROUND

This invention relates, in general, to facilitating processing within a processing environment, and in particular, to efficiently collecting data relating to execution of tasks within the processing environment to enhance processing thereof.

Improved system performance and reduced errors are high priority goals of many processing environments. In an effort to achieve these goals, diagnostic and tuning tools are employed. One such tool is a sampling facility that gathers data relating to processing that occurs within a processing environment.

Specifically, a sampling facility is used to periodically take a snapshot of a central processing unit executing within the environment and to record state information associated with the central processing unit. This information is used for debugging and/or to improve system performance.

Today, at each sampling time, the data is collected, stored in a register, and an interrupt is provided to the control program. Upon interruption, the control program reads out the sample data, resets the register and resumes the operation. This interruption at each sampling interval creates significant system overhead, and in some real-time environments, may even distort the measured data. This overhead problem causes users to limit the amount of sample data to be collected, and thus, limit the practical use of the sampling facility.

BRIEF SUMMARY

Based on the foregoing, a need exists for an enhanced sampling facility that is less disruptive and more effective than current sampling facilities.

The shortcomings of the prior art are overcome and additional advantages are provided through the provision of a computer program product for executing a machine instruction in a central processing unit of a computing environment. The computer program product comprises a computer readable storage medium readable by a processing circuit and storing instructions for execution by the processing circuit for performing a method. The method includes, for instance, obtaining a machine instruction for execution, the machine instruction being defined for computer execution according to a computer architecture, the machine instruction including an opcode field identifying a set program parameter instruction; and a first field identifying a general register, the contents of which are added to the contents of a second field to form a second operand address; and executing the machine instruction, the executing including responsive to a configuration of the computing environment being configured for sampling to obtain sample data relating to the computing environment, placing a program parameter stored in one or more storage locations designated by the second operand address in a program parameter register, the program parameter register comprising an identifier identifying a task; and responsive to the configuration not being configured for sampling, executing the machine instruction as a no operation.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a CPU measurement sampling facility is provided that takes a snapshot of the central processing unit on which it is executing at specified sampling intervals to collect data regarding tasks (e.g., applications, modules, functions, instructions, etc.) executing on the central processing unit. This data is collected for statistical estimation of performance characteristics. The collected data is stored in a buffer and at selected times, an interrupt is provided to empty the buffer to enable reuse thereof. The interrupt is not taken after each sample, but in sufficient time to remove data from the buffer and minimize data loss.

Figure 1:
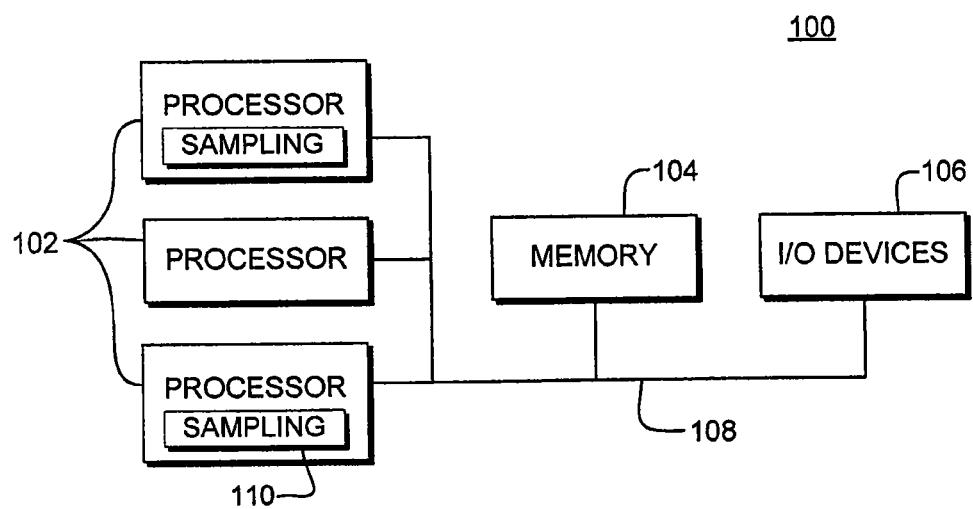
FIG. 1 depicts one embodiment of a processing environment to incorporate and use one or more aspects of the present invention.

One embodiment of a processing environment incorporating and using one or more aspects of the present invention is described with reference to FIG. 1. Processing environment 100 is, for instance, a multiprocessing environment including a plurality of processors 102 (e.g., central processing units (CPUs)), a memory 104 (e.g., main memory) and one or more input/output (I/O) devices 106 coupled to one another via, for example, one or more buses 108 or other connections.

As one example, each processor 102 is a z10 processor based on the z/Architecture® of International Business Machines Corporation, Armonk, N.Y., and one or more of the processors execute a control program, such as the z/OS® or z/VM® operating systems offered by International Business Machines Corporation. One example of the z/Architecture® is described in "z/Architecture—Principles of Operation," SA22-7832-06, Seventh Edition, February 2008, which is hereby incorporated herein by reference in its entirety. z/OS®, z/Architecture®, and z/VM® are registered trademarks of International Business Machines Corporation, Armonk, N.Y., U.S.A. Other names used herein may be registered trademarks, trademarks or product names of International Business Machines Corporation or other companies.

To provide information to facilitate processing within the processing environment, data is gathered on a regular basis. This data is used, for instance, for debugging purposes and/or to improve system performance. For example, a CPU measurement sampling function 110 is executed on one or more of the CPUs and for each CPU on which it is executing, it provides a snapshot of the logical CPU at each specified sampling interval, which is a processing time interval as seen by the CPU. Each snapshot produces a set of sample data, which includes, for instance, the instruction address of an instruction being executed and some state information about the CPU. This sample data is stored, for instance, in one or more sample data blocks of a buffer.

In one example, the CPU measurement sampling facility includes two sampling functions, several sampling control registers, several external interruption events and various instructions, each of which is described below.

The two sampling functions include, for instance, basic sampling and diagnostic sampling. The basic sampling function provides a set of architected sample data. The sample data includes an instruction address, the primary address space number (PASN), and some state information about the CPU, as examples. This allows tooling programs to map instruction addresses into modules or tasks, and facilitates determination of hot spots. The diagnostic sampling function provides a set of non-architected sample data, and is intended for use by hardware design analysts, operating systems, sophisticated compilers, and internal subsystems. Since the sample data provided by the diagnostic sampling function may reveal detailed internal hardware design, a console with a controlled password may be used to authorize use of the function.

Both the basic sampling and diagnostic sampling functions use the same sampling control registers, the same sampling buffer structure, the same external interruption events, and the same instructions. The main difference between these two functions is the sample data.

The sample data size and format for each sampling function are model dependent and are determined by, for instance, a 16-bit data entry format code, which is stored in each sample data. The sample data provided by the basic sampling function is not included in the sample data provided by the diagnostic sampling function. To get meaningful diagnostic sampling data, both sampling functions should be activated. The state of each sampling function can be individually set by executing a Set Sampling Controls instruction, which is described below. Both sampling functions are disabled by initial CPU reset, clear reset or power-on reset.

In one example, the external interruption events include an invalid entry address alert, an incorrect sample data block table entry alert, a program request alert, a sampling authorization change alert, and a loss of sample data alert. These events are part of an external interruption subclass, called the measurement alert subclass. The subclass mask bit, e.g., bit 58 of control register zero, is provided. This bit is initialized to one, which enables the interruption.

The CPU measurement sampling facility provides a number of sampling control registers. Except for authorization controls, the contents of these control registers are cleared to zeros by initial CPU reset, clear reset or power-on reset; and may also be cleared to zeros by executing the Set Sampling Control instruction that disables all sampling functions. Authorization controls are set or reset by an external means.

Figure 2A:
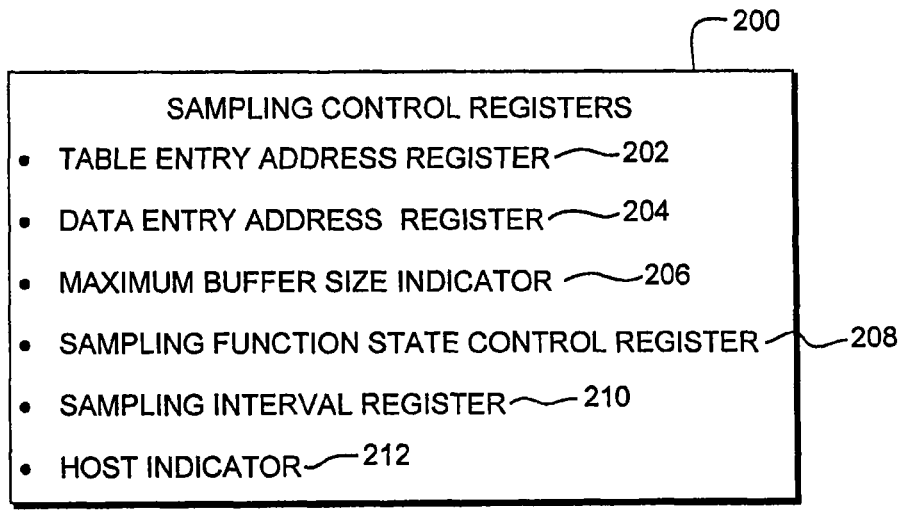
FIG. 2A depicts one example of various sampling control registers used in accordance with an aspect of the present invention.

Examples of sampling control registers are described with reference to FIG. 2A. In one example, these registers are hardware registers within the CPU. As shown, sampling control registers 200 include, for instance, a table entry address register (TEAR) 202; a data entry address register (DEAR) 204; a maximum buffer size indicator 206; a sampling function state control register 208; a sampling interval register 210; and a host indicator 212, each of which is described below.

Figure 2B:
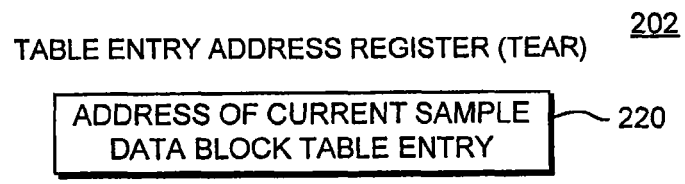
FIG. 2B depicts one example of the contents of a table entry address register of FIG. 2A, in accordance with an aspect of the present invention.

As shown in FIG. 2B, table entry address register 202 is, for instance, 64 bits, and includes, an address of a current sample data block table entry 220. It is unpredictable whether the address is real or absolute.

Figure 2C:
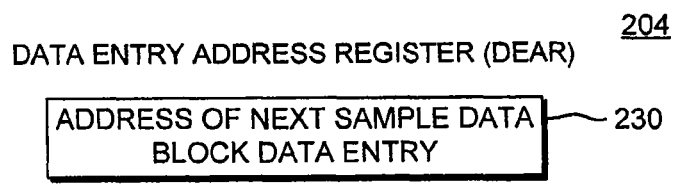
FIG. 2C depicts one example of the contents of a data entry address register of FIG. 2A, in accordance with an aspect of the present invention.

Referring to FIG. 2C, data entry address register 204 is, for instance, 64 bits, and includes an address of the next sample data block data entry 230. Again, it is unpredictable whether the address is real or absolute.

In one example, maximum buffer size indicator 206 is one bit. When the indicator is zero, the maximum size of the sample data block tables and the size of the sample data blocks are 4K bytes. When the indicator is one, the maximum size of the sample data block tables and the size of the sample data blocks are 1M bytes.

Sampling function state control register 208 is, for instance, 6 bits, and three bits are assigned to the basic sampling function and the other three bits are assigned to the diagnostic sampling function. For each sampling function, there are, for instance, three state control indicators, including: authorization control (A), enable control (E), and activation control (C).

Sampling interval register 210 is, for instance, 64 bits, and the contents of the register specify the number of CPU cycles within each sampling interval.

Host indicator 212 is, for instance, one bit and is available to CPUs at the logical partition level (described below). When the CPU is running at the logical partition level and if a sampling function is active, the host indicator when zero specifies that the contents of the program parameter register are stored into the guest program parameter field of the sample data blocks by the sample data block update process; the host indicator, when one, specifies that the contents of the program parameter register are stored into the host program parameter field.

When the CPU is in the operating state, a sampling function can be in any of the following four states, as examples: unauthorized, disabled, inactive, and active.

Unauthorized: When a sampling function is in the unauthorized state, the function cannot be used and no sample data is stored. An external means is provided to authorize or unauthorize the use of the function.

Disabled: When a sampling function is in the disabled state, the function is authorized for use, but the control program has not enabled the function yet. In this state, no new sample data is stored, and the contents of the sample data blocks remain unchanged, and no sampling control, except for authorization controls, is preserved.

Inactive: When a sampling function is in the inactive state, the function is authorized, enabled, and deactivated. In this state, no new sample data is stored, the contents of the sample data blocks remain unchanged, and sampling controls are preserved and can be extracted.

Active: When a sampling function is in the active state, the function is authorized, enabled, and activated. In this state, new sampling data is stored during each sampling interval and sampling controls can be extracted.

When the CPU enters the stopped state from the operating state, active sampling functions are stopped. When the CPU enters the operating state from the stopped state, sampling functions resume the states they were in when they were last stopped.

The following table summarizes actions that cause state transitions of a sampling function:

| | | To | | |
|---|---|---|---|---|
| From | Unauthorized | Disabled | Inactive | Active |
| Unauthorized | —* | External control | Not applicable | Not applicable |
| Disabled | External control | —* | Enabled & deactivated by SSCTL. | Enabled & activated by SSCTL. |
| Inactive | External control | Disabled by SSCTL, or by reset[1]. | —* | Activated by SSCTL. |

| | | To | | |
|---|---|---|---|---|
| From | Unauthorized | Disabled | Inactive | Active |
| Active | External control | Disabled by SSCTL, or reset[1]. | Deactivated by SSCTL or by errors[2]. | —* |

Explanation:
[1]Each enabled sampling function is disabled by initial CPU reset, clear reset or power-on reset.
[2]Each active sampling function is deactivated by an invalid entry address alert, an incorrect sample data block table entry alert, or a loss of sample data alert.
*When a sampling function is in the unauthorized, disabled, inactive, or active state, if execution of SSCTL sets the state controls to the same state as the original state, the state controls are considered successfully set.
—No action required.
SSCTL The SET SAMPLING CONTROLS instruction.
Not applicable This state transition cannot occur.

The sample data is stored in a buffer in, for instance, main memory. For example, a number of sample data blocks (that comprise a buffer) are allocated by the control program for the machine to store sample data during each sampling interval. Each sample data block is designated by a block link entry in a sample data block table. The current entry of the sample data block table is designated by the contents of the table entry address register and the next data entry of the sample data block is designated by the contents of the data entry address register. One example of the structure of a sampling buffer, in accordance with an aspect of the present invention, is depicted in FIG. 3.

Figure 3:
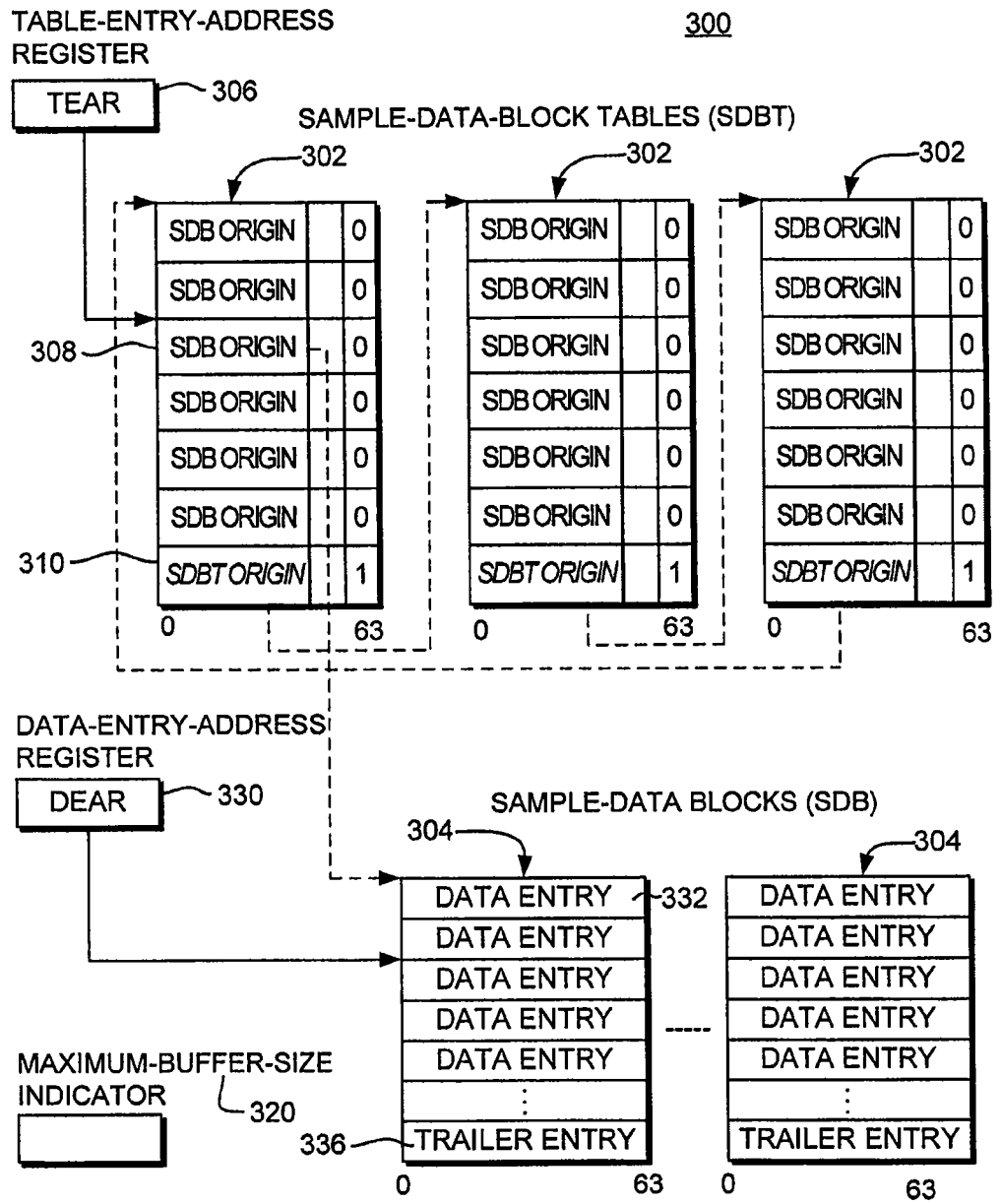
FIG. 3 depicts one embodiment of the structure of a sampling buffer used in accordance with an aspect of the present invention.

Referring to FIG. 3, a sampling buffer 300 includes one or more sample data block tables (SDBTs) 302 and one or more sample data blocks (SDB) 304. In this particular example, three (3) sample data block tables are shown, which are coupled in a circular linked list. Further, in this example, there are a plurality of sample data blocks. It is understood that other examples of the sampling buffer can have more, less or the same number of SDBTs and/or more, less or the same number of SDBs, as shown in this particular example.

The contents of a table entry address register (TEAR) 306 point to the current entry of a sample data block table 302. There are two kinds of entries in each sample data block table including, for instance: block link entries 308 and table link entries 310. Each block link entry 308 includes a sample data block (SDB) origin, and each table link entry includes a sample data block table (SDBT) origin. In this particular embodiment, each sample data block table starts at an integral boundary of 16 bytes, and each entry is 8 bytes. Each sample data block table 302 includes a number of block link entries 308 and one table link entry 310. A specified bit in each entry (e.g., bit 63) distinguishes a block link entry from a table link entry. When bit 63 is zero, the entry is a block link entry; when bit 63 is one, the entry is a table link entry. A table link entry is the last entry in the sample data block table. The actual size of a sample data block table is determined by the location of the table link entry, and does not exceed the size specified in the maximum buffer size indicator. The origin and the table link entry of a sample data block table cannot be separated by an integral boundary of the maximum buffer size, in this embodiment.

When a maximum buffer size indicator 320 is zero, a specified portion (e.g., bits 0-51) of a block link entry include the origin of a sample data block in real or absolute store. When the sample data block origin is to be placed in the data entry address register, it is appended with zeros (e.g., 12 zeros) on the right to form a 64 bit address and the address is then placed in the register.

When maximum buffer size indicator 320 is one, specified bits (bits 0-43) of a block link entry include the origin of a sample data block in real or absolute storage. When the sample data block origin is to be placed in the data entry address register, it is appended with a number of zeros (e.g., 20) on the right to form a 64 bit address and the address is then placed in the register.

In one example, bits 0-59 of table link entry 310 include the origin of a sample data block table in real or absolute storage. When the sample data block table origin is to be placed in the table entry address register, it is appended with a number of zeros (e.g., 4) on the right to form a 64 bit address and the address is then placed in the register.

Continuing to refer to FIG. 3, the contents of a data entry address register 330 designates the next data entry 332 of a sample data block 304. Each sample data block starts at an integral boundary of the maximum buffer size. The size of a sample data block is equal to the size specified in the maximum buffer size indicator.

In one example, there are two kinds of entries in each sample data block, including, for instance, data entry 332 and a trailer entry 336. The last number of bytes (e.g., 64) of a sample data block form the trailer entry; all other space in the block is used to form data entries.

When at least one sampling function is active, a data entry is stored during each sampling interval. If only the basic sampling function is active, the data entry stored is a basic sampling data entry; if only the diagnostic sampling function is active, the data entry stored is a diagnostic sampling data entry. If both sampling functions are active, the data entry stored is a combined data entry. Each of these data entries is explained in further detail below.

Figure 4A:
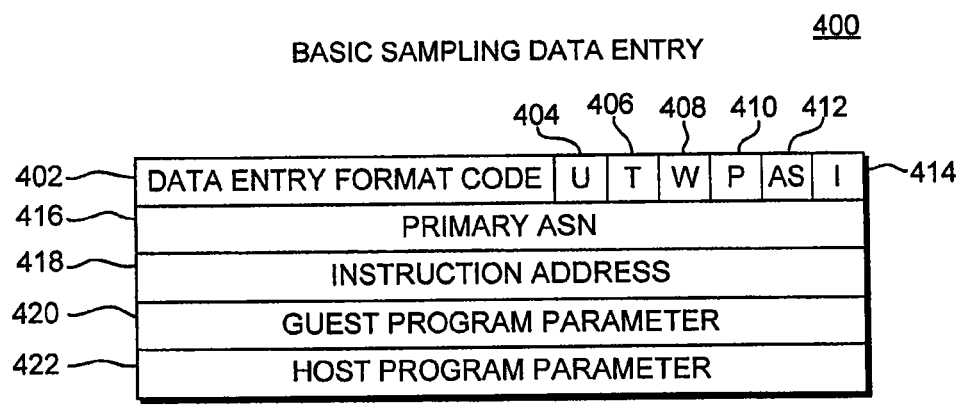
FIG. 4A depicts one embodiment of the fields of a basic sampling data entry, in accordance with an aspect of the present invention.

One example of the basic sampling data entry is described with reference to FIG. 4A. In one example, a basic sampling data entry 400 includes, for instance, the following fields:

Data Entry Format Code 402: Bits 0-15 of the data entry include the format code of the data entry.

Number of Unique Instructions (U) 404: Bits 20-23 of the data entry specify the number of unique, completed instructions that were executed simultaneously during the sampling cycle when the unique cycle indicator is on.

A pipelined CPU can execute multiple instructions concurrently in an overlapped fashion: each of these instructions being executed concurrently is in a different pipeline stage. Furthermore, on some models, each stage of a pipelined CPU may execute multiple instructions simultaneously.

During an instruction execution, a unique cycle indicator is turned on for one cycle at the sample point, that is the place in the CPU the sample data is taken from. The sampling point depends on the model, but is the same for all instructions executed on the same model. For a pipelined CPU, the sampling point is usually a particular pipeline stage. Depending on the model, it is unpredictable when the unique cycle indicator is turned on during an instruction execution. This field includes the number of instructions executed simultaneously at the sampling point when the unique cycle indicator is on.

When a sampling time occurs and if the sampling point is not busy because either the CPU is in the wait state or because of delay in some other pipeline stage, the contents of this field are set to zero.

The contents of this field can be used to estimate cycles per instruction when a sufficiently small sampling interval and an adequately larger number of samples are used.

The cycles per instruction for a particular measurement can be estimated by dividing the number of busy samples, that is samples with the wait state bit (described below) being set to zero, by the total number of unique instructions in all busy samples.

DAT Mode (T) 406: Bit 26 of the data entry includes the data address translation (DAT) mode bit in the Program Status Word (PSW) of the CPU.

Wait State (W) 408: Bit 27 of the data entry includes the wait state bit in the PSW of the CPU.

Problem State (P) 410: Bit 28 of the data entry includes the problem state bit in the PSW of the CPU.

Address Space Control (AS) 412: Bits 29-30 of the data entry include the address space control in the PSW of the CPU.

Invalid Indication (I) 414: Bit 31 of the data entry indicates whether the entry is valid or invalid. When the bit is zero, the entry is valid; when the bit is one, the entry is invalid. An entry is set to invalid when sample data in the entry are not consistent.

Primary ASN 416: Byte offsets 6-7 of the data entry include the Primary Address Space Number (PASN) in bits 48-63 of control register 4 of the CPU.

Instruction Address 418: Byte offsets 8-15 of the data entry include the instruction address of an instruction that the CPU was executing during the sampling cycle.

Instruction addresses are treated as real addresses in the real mode; as primary virtual addresses in the primary address mode, secondary space mode, or access register mode; and as home virtual addresses in the home space mode.

When the sampling point is executing multiple instructions simultaneously during the sampling cycle, only the address of one instruction among these simultaneously executed instructions is reported. The selection of which instruction address to be reported is model dependent.

On some models, the address of the target instruction of Execute is not reported in the same data. When the wait state bit is one, the contents of this field are unpredictable. When a sampling time occurs and if the sampling point is not executing any instruction because of delay in some other pipeline stage, it is unpredictable which address of the instructions being executed concurrently in the CPU is reported.

Guest Program Parameter 420: Byte offsets 16-23 of the data entry include the current program parameter register if the CPU is not running at the logical partition level or if it is running at the logical partition level and the host indicator is zero. If the CPU is running at the logical partition level and the host indicator is one, zero is stored in this field.

Host Program Parameter 422: Byte offsets 24-31 of the data entry include the current program parameter register if the CPU is running at the logical partition level and the host indicator is one. Otherwise, the contents of this field are unpredictable.

Figure 4B:
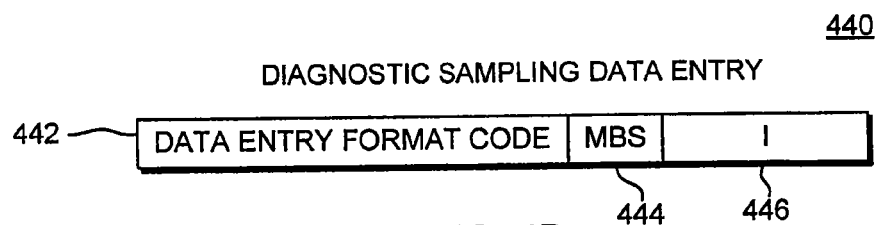
FIG. 4B depicts one embodiment of the fields of a diagnostic sampling data entry, in accordance with an aspect of the present invention.

One example of a diagnostic sampling data entry 440 is described with reference to FIG. 4B. In one example, diagnostic sampling data entry 440 includes:

A data entry format code 442: Bits 0-15 of the data entry includes the format code of the data entry.

Maximum buffer size 444: Bit 19 is intended to indicate the maximum buffer size. Zero indicates 4K bytes, and one indicates 1 megabytes.

Invalid Indication (I) 446: Bit 31 of the data entry indicates whether the entry is valid or invalid. When the bit is zero, the entry is valid; when the bit is one, the entry is invalid. An entry is set to invalid when sample data in the entry are not consistent.

The rest of this entry includes non-architected sample data.

When both the basic sampling function and the diagnostic sampling function are active, the sample data stored during each sampling interval is a combined data entry, which includes a basic sampling data entry followed by a diagnostic sample data entry.

When a combined data entry is to be stored, it is completely stored in the current sample data block if there exists enough space. When there is not enough space in the current sample data block, if there is enough space in the next sample data block, then the entire combined sample data is stored in the next sample data block. The basic sampling data entry and the diagnostic sampling data entry of a combined data entry are not stored in different sample data blocks, in this example. When the combined sample data is discarded because of no space available, the sample overflow count of the current sample data block is incremented by one.

Figure 4C:
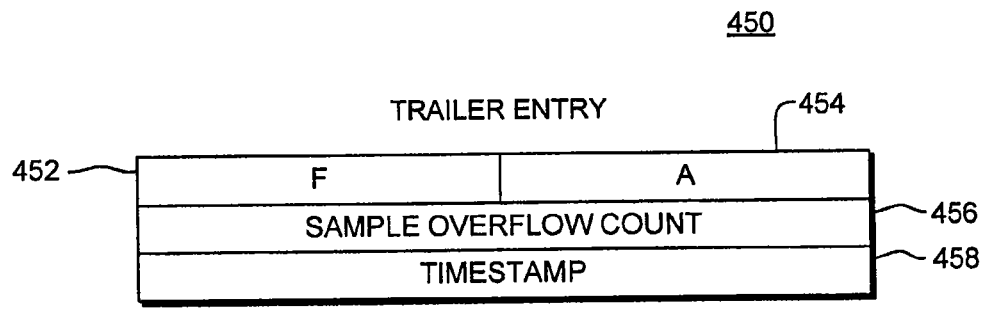
FIG. 4C depicts one embodiment of the fields of a trailer entry, in accordance with an aspect of the present invention.

One embodiment of the fields associated with a trailer entry are described with reference to FIG. 4C. Each trailer entry is, for instance, 64 bytes and resides in the last 64 bytes of a sample data block. In one example, a trailer entry 450 includes, for instance:

Block Full Indicator (F) 452: Bit zero of byte offset 0 of the trailer entry is a block full indicator. When the indicator is one, the sample data block is full.

Alert request control (A) 454: Bit 1 of byte offset 0 of the trailer entry is the alert request indicator. When the indicator is one and the sample data block becomes full, a program request alert external interruption event is recognized at the completion of the sample data block update process. Herein, the sample data block is considered full when its block full indicator is set, regardless of whether it is entirely full. If the block has additional space, but not enough to store the next sample, the indicator is set and the block is considered full.

The setting of the alert request control is selectable. For example, it can be set in every x (e.g., 10) data blocks. Thus, even if one data block of the buffer is full, there need not be an interrupt until a data block is reached with the indicator set, such as after the tenth full data block. The selection of 10 is only one example; any other desired number may be used. Thus, an interrupt may not be taken after the sample interval or even if one data block is full.

Sample overflow count 456: Bytes offsets 8-15 of the trailer entry include the number of sample data entries that have been lost because the sample data block is full.

Timestamp 458: Byte offsets 16-31 of the trailer entry include the time-of-day (TOD) clock value at the time when the sample data block becomes full.

When a program request alert occurs, it is expected that the program (e.g., control program, such as an operating system) reads out sample data from the sample data blocks that are full. To free up these blocks, the program shall reset the block full indicator (F) and the sample overflow count, and shall also reestablish an alert request control (A). Updating these fields in a sample data block shall be performed, in one example, as an interlocked update using, a Compare Double and Swap instruction. All of these reads and updates are performed while sampling functions remain active.

When the CPU is in the operating state and at least one sampling function is active, the sample data block update process is performed at each sampling time. The process locates space for the new data entry, forms the entry, and updates the contents of the data entry address register so that the register contents designate the location of the next data entry.

During the sample data block update process, if any address is formed through the addition of a value to another address, a carry out of bit position zero of the address, if any, is ignored. Similarly, when the contents of the sample overflow count field is incremented, a carry out of bit position zero of the count, if any, is ignored.

Accesses to a sample data block are not subject to key controlled protection; nor are they subject to low address protection.

When storage access to a sample data block entry or sample data block table entry is performed, if the address is invalid, a measurement alert external interruption event (invalid entry address) is recognized, and active sampling functions for that CPU are placed in the inactive state. An entry address is invalid if, for instance, the address is in the range 0-8191; if the designated sample data block entry is inside the trailer entry; or if the designated storage location is not available in the configuration.

When storage access to a sample data block table entry is performed, if any incorrect SDB table entry is detected, a measurement alert external interruption event (incorrect sample data block table entry) is recognized, and active sampling functions for that CPU are placed in the inactive state. A sample data block table entry is incorrect if the entry is a table link entry and it designates another table link entry, or if the last table entry is not a table link entry.

The contents of the data entry address register are used to locate the next data entry in the current sample data block. If the next data entry resides inside the trailer entry (e.g., last 64 bytes) of the sample data block, then a measurement alert external interruption event (invalid entry address alert) is recognized and sampling functions are placed in the inactive state.

Figure 5A:
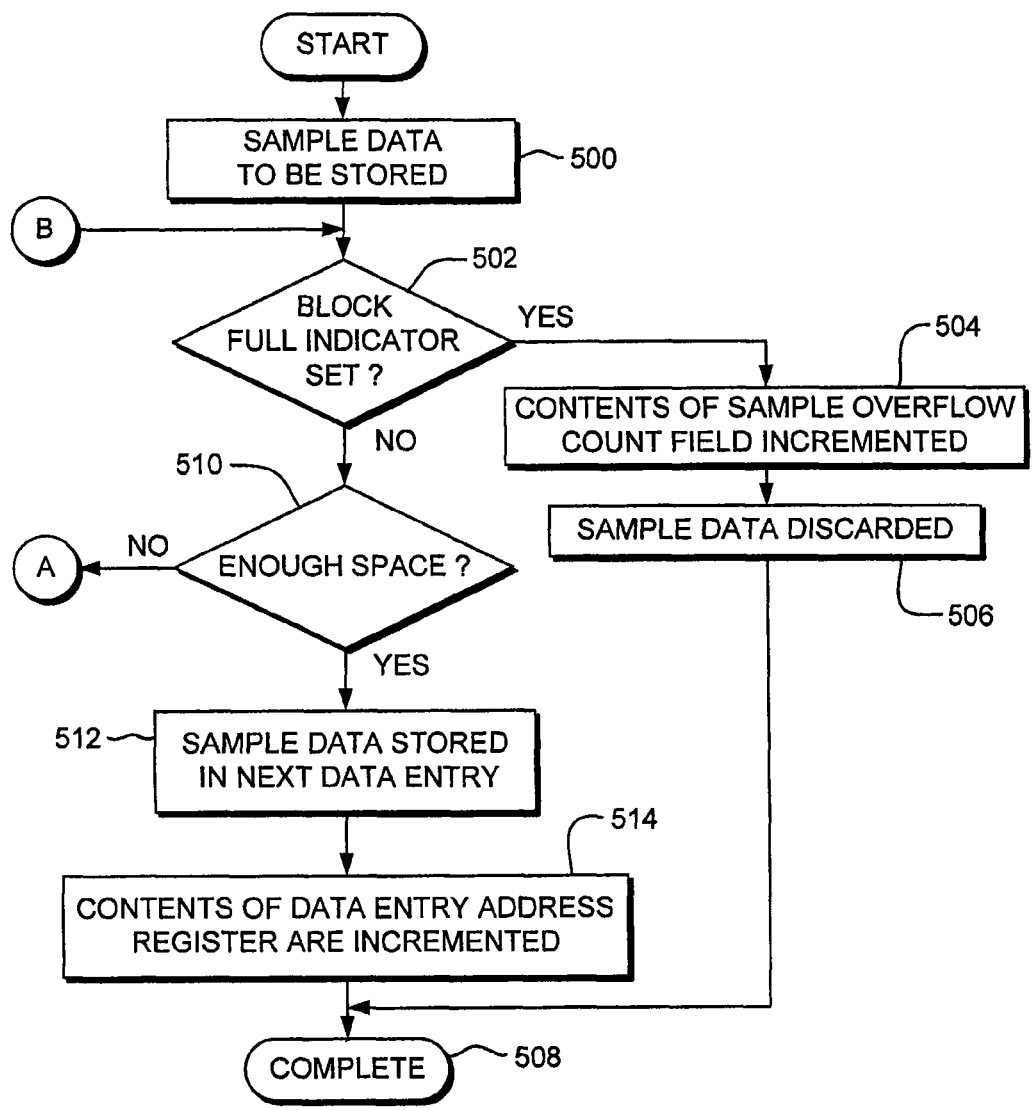
FIGS. 5A-5B depict one embodiment of the logic associated with updating a sampling buffer, in accordance with an aspect of the present invention.

One embodiment of the logic associated with updating a sampling buffer, in accordance with an aspect of the present invention, is described with reference to FIGS. 5A-5B. Referring to FIG. 5A, initially, sample data has been obtained during a sampling function and it is to be stored in the buffer, STEP 500. A determination is made as to whether the block full indicator in the trailer entry of the current sample data block is set (e.g., equal to one), INQUIRY 502. If the block full indicator is set, then at this point, it indicates that there is insufficient space in the buffer to store the data. The contents of the sample overflow count field of the trailer entry are incremented by one, STEP 504, and the sample data to be stored is discarded, STEP 506. This completes the update process, STEP 508.

Returning to INQUIRY 502, if, however, the block full indicator in the trailer entry of the current sample data block is zero, a determination is made as to whether there is enough space to store the sample data, INQUIRY 510. If the block full indicator is zero and there exists enough space, then the sample data is stored in the next data entry, STEP 512, and the contents of the data entry address register are incremented by the data entry size, STEP 514. The update process is complete, STEP 508.

On the other hand, returning to INQUIRY 510, if the block full indicator is not set and there is not enough space to store the sample data in the next data entry, then the block full indicator in the trailer entry of the current sample data block is set to one, STEP 520 (FIG. 5B), and the time of day clock value is placed in the timestamp field of the trailer entry, STEP 522.

Thereafter, a determination is made as to whether the alert request indicator in the trailer entry is one, INQUIRY 524. If the alert request indicator in the trailer entry is one, a measurement alert external interruption event (program requested alert) is recognized at the end of the update process, STEP 526. Thereafter, or if the alert request indicator is not set, the contents of the table entry address register are incremented by the SDB table entry size so that the next entry in the SDB table becomes the current SDB table entry, STEP 528. The current SDB table entry is fetched and bit 63 of the entry is examined, STEP 530. If bit 63 of the SDB table entry is zero, the entry is a block link entry and includes a sample data block (SDB) origin; if bit 63 is one, the entry is a table link entry and includes a sample data block table (SDBT) origin.

If the fetched entry is the last entry in the SDB table, (i.e., the entry is the last entry before reaching the maximum buffer size), INQUIRY 532, and if the entry is not a table link entry (i.e., bit 63 of the entry is zero), INQUIRY 534, then a measurement alert external interruption event (incorrect SDB table entry alert) is recognized, STEP 536. Active sampling functions are placed in the inactive state and the update process is complete, STEP 538.

Returning to INQUIRY 534, if it is the last entry and bit 63 is one, then the address of the origin of the SDB table specified in the entry is placed in the table entry address register so that the specified table becomes the current SDB table, STEP 540. The current SDB table entry is fetched and bit 63 of the entry is examined, STEP 542. If bit 63 is one, INQUIRY 544, indicating that the SBD table entry pointed to by the table link entry is itself a table link entry, a measurement alert external interruption event (incorrect SDB table entry alert) is recognized, STEP 536. Active sampling functions are placed in the inactive state and the update process is complete, STEP 538.

However, if bit 63 is zero, INQUIRY 544, then the address of the origin of the sample data block specified in the entry is placed in the data entry address register so that the block becomes the current sample data block, STEP 546. Processing then continues at INQUIRY 502 (FIG. 5A), as described above.

Returning to INQUIRY 532 (FIG. 5B), if the fetched entry is not the last entry in the SDB table (i.e., not the last entry before reaching the boundary), and if bit 63 of the fetched table entry is zero, INQUIRY 550, then processing continues at STEP 546, as described herein. However, if bit 63 of the fetched entry is one, indicating there are no more entries in the table, even though the table has more space, then processing continues with STEP 540, as described herein.

As indicated with reference to STEP 526, in response to determining that an alert request is set in the trailer entry of a sample data block that is indicated as full, a measurement alert external interruption event is recognized at the end of the update process. One embodiment of this processing is described with reference to FIG. 5C.

Figure 5B:
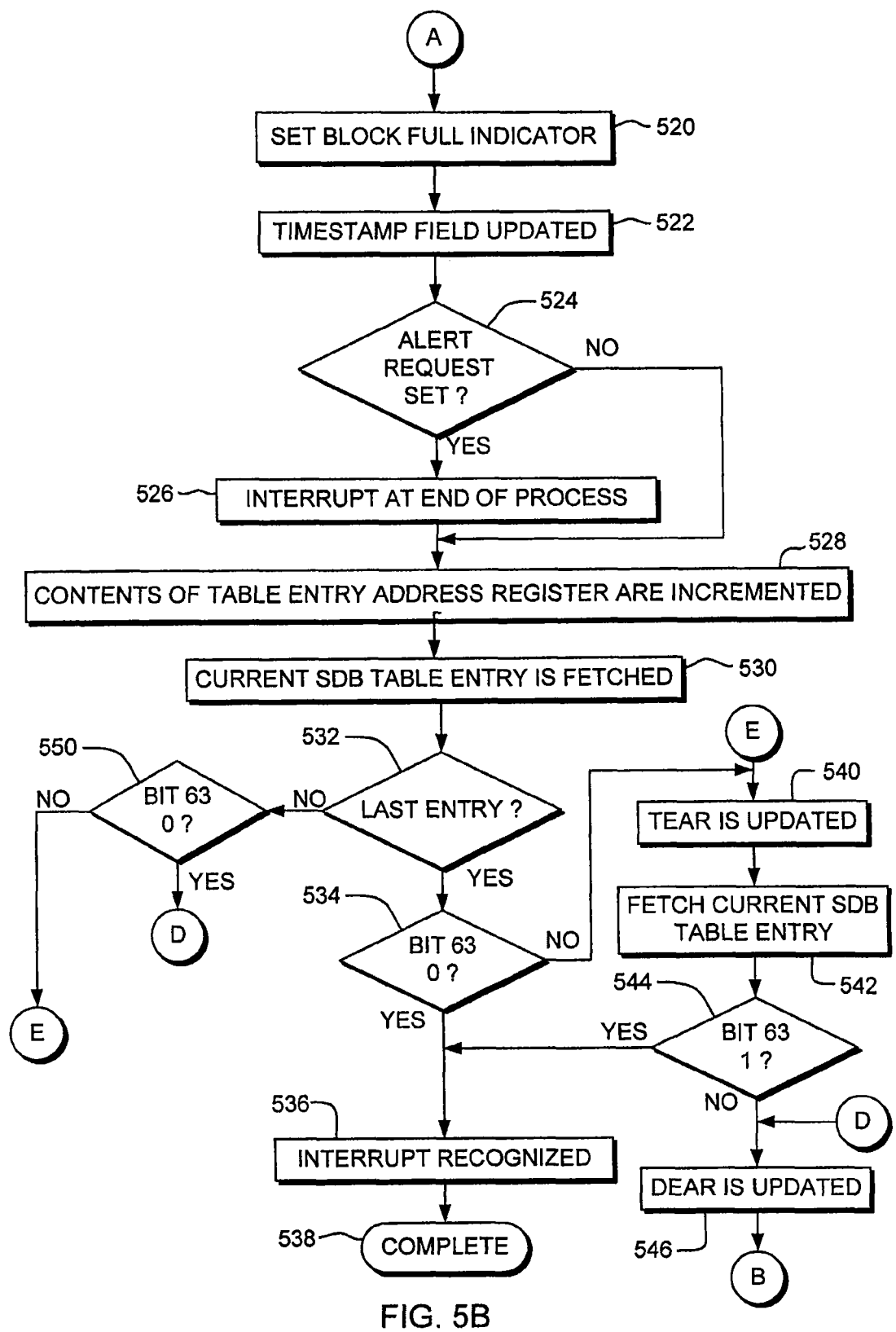
Figure 5C:
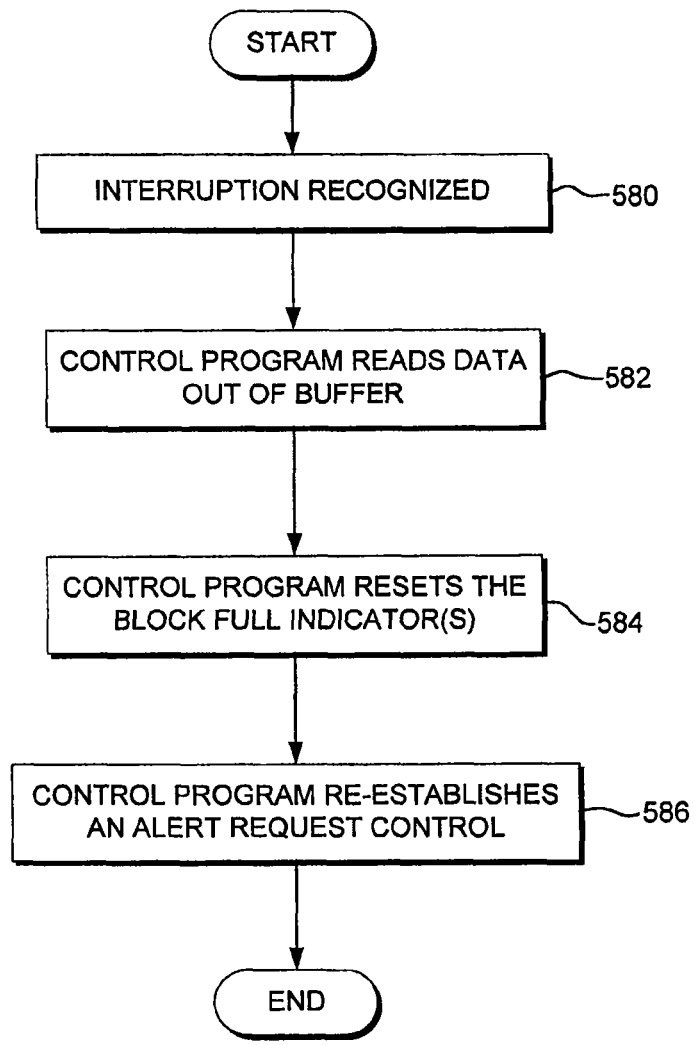
FIG. 5C depicts one embodiment of the logic associated with providing an interrupt to read the collected data from the buffer, in accordance with an aspect of the present invention.

Referring to FIG. 5C, an interruption is recognized at the end of the update process, STEP 580. In response thereto, the control program reads the data stored in one or more sample data blocks (e.g., the blocks that are full, or all the blocks that have data or a subset thereof) and writes that data to DASD or another storage medium, STEP 582. Additionally, in an interlocked update operation, the control program resets the block full indicator in the trailer entry of any of the blocks that were full, STEP 584, and re-establishes an alert request control STEP 586. In one example, the re-establishing includes setting (or leaving set) the same alert indicator that initiated the interrupt. In other examples, however, one or more other alert indicators can be set. An alert indicator can be set in one or more trailer entries, depending on how frequently the data is to be dumped.

The alert indicator is set, for instance, in at least one data block, which is selected to provide sufficient time to dump the data before the buffer is full, minimizing the loss of sample data. If, however, a small amount of data is lost, the collected data still continues to be useful. On the other hand, if a significant amount of data is lost, which is implementation dependent, then the collected sample data is ignored.

The buffer update process described with reference to FIGS. 5A-5C is part of an overall sampling process that takes place to capture sample data. The sampling process begins by an operator request, in response to which a sampling function is initiated. There may be one or more sampling functions initiated by one or more operators concurrently. One embodiment of an overview of a sampling process is described with reference to FIG. 6.

Figure 6:
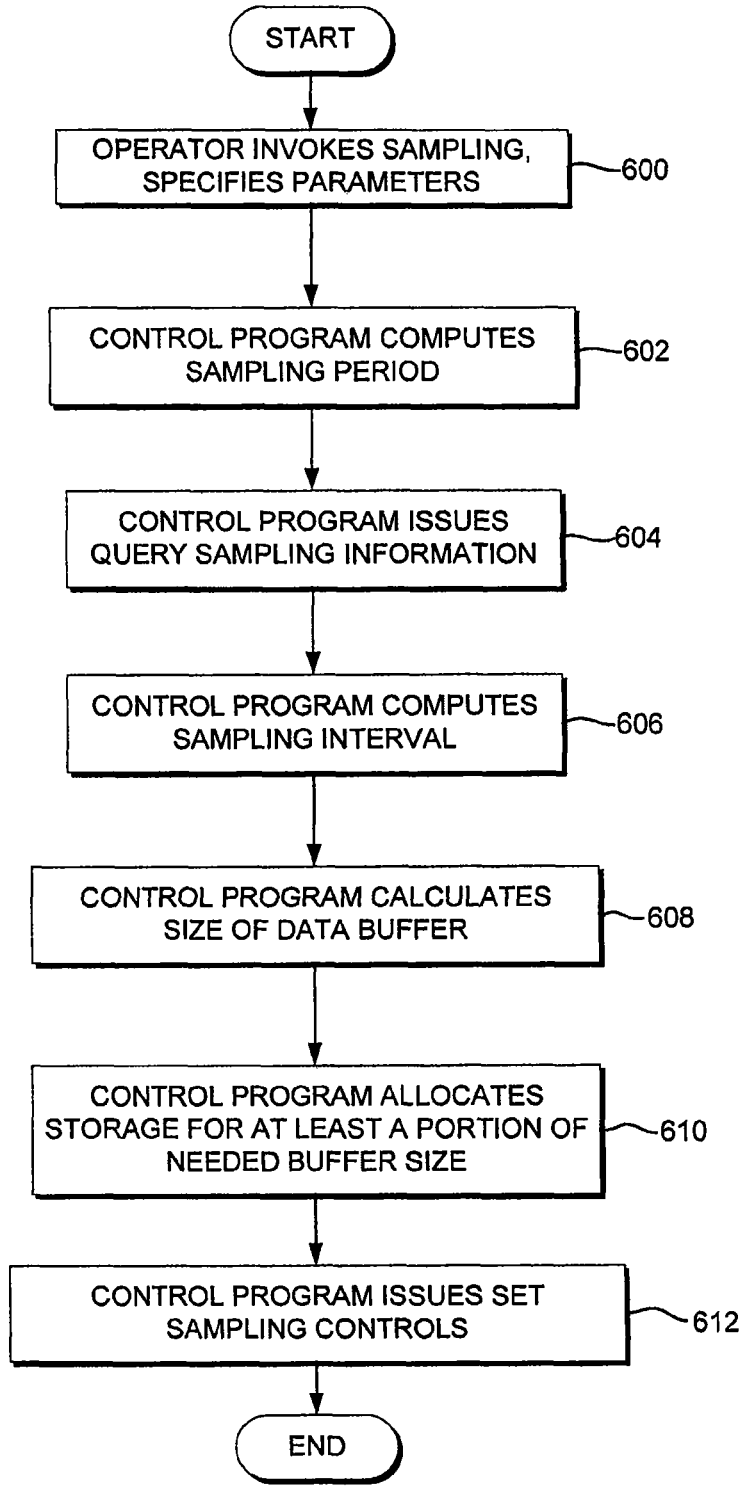
FIG. 6 depicts one embodiment of an overview of the logic associated with performing a sampling function, in accordance with an aspect of the present invention.

Referring to FIG. 6, initially, an operator invokes a sampling function and specifies various parameters including, for instance, the sampling frequency, F, (e.g., the number of samples to be collected per minute), the duration of the sampling run in minutes, D, and the type of sampling (e.g., basic, diagnostic, or combined), STEP 600.

Additionally, the control program issues a Query Sampling Information (QSI) instruction, described below, that provides information about the sampling facility, STEP 604. In one example, this information includes the basic sampling data entry size (BSDES) in bytes, the diagnostic sampling data entry size (DSDES) in bytes, and the CPU speed=C cycles/microseconds. With the obtained information, the control program calculates the sampling interval for each processor in the measurement=i cycles/sec, STEP 606. For instance, F=overall sampling frequency in samples/minute;
p=number of processors involved in the measurement;
f=(F/60)/p=individual sampling frequency for each processor in samples/second;
C=CPU speed in cycles/(10**-6) seconds;
i=(1/f)C=individual sampling interval for each processor in cycles/sample.

Further, the individual sampling frequency (defined above), f, the sample data entry size, L, and the specified duration of the sampling run, D, are used to calculate how large the data buffer for each processor needs to be, STEP 608. The sample data entry size, L, is calculated using the specified sampling type and the size of each entry type (BSDES and DSDES) returned by the QSI instruction. For instance, L=sampling data entry size in bytes;
if only basic sampling is used, L=BSDES;
if only diagnostic sampling is used, L=DSDES;
if both basic and diagnostic sampling are used, L=BDES+DSDES;
f=individual sampling frequency for each processor in samples/second;
D=intended duration of the run in minutes;
B=f*L*D*60=buffer size in bytes needed for all of the samples on an individual processor for the entire sampling run.

Based on the above information, the control program allocates storage for the buffer, STEP 610. In accordance with an aspect of the present invention, the total buffer size need not be allocated. Instead, only a portion of the buffer is allocated and at specific times, an interrupt is initiated to remove data from the buffer and that same buffer may be reused. Storage is allocated for the desired buffer size and the storage is formulated into the form of the sampling data buffer described with reference to FIG. 3.

The buffer size allocated by the control program is to be large enough so that the control program can service the interruption before the allocated buffer is full. Allocating a buffer larger than this minimum value will require the control program to be interrupted less frequently. The time needed between control program interruptions is to guarantee servicing of each interrupt before the next is presented. The control program considers these factors when determining the portion of the needed buffer size to allocate, STEP 610.

The minimum size of the buffer to be allocated for each processor involved in the measurement, b, is calculated using the individual sampling frequency, f, the sample size, L, and the control program service interval, T. For instance, T=time in sec between control program interrupts needed to service the buffer;

b=f*L*T=minimum allocated buffer size in bytes.

Once the minimum and maximum values have been calculated, the control program determines a practical buffer size, including a safety margin. For example, the minimum buffer size, b, is multiplied by a value of 4 to allow the asynchronous writing of the buffer to occur without losing samples being collected concurrent to the write operation; it is understood that the write operation takes a nontrivial amount of time to complete.

Thereafter, the control program issues a Set Sampling Controls instruction, described below, to activate the sampling function, STEP 612. In response to issuing this instruction, sampling is performed and the sampled data is handled in the manner described above with reference to FIGS. 5A-5C.

Figure 7A:
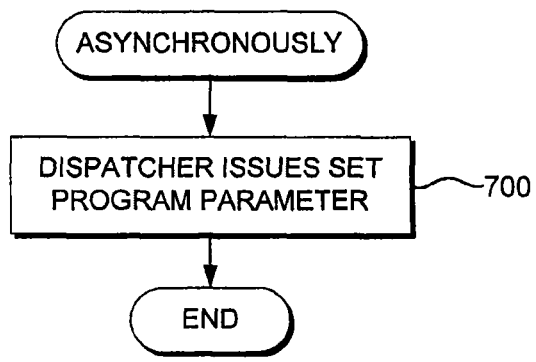
FIG. 7A depicts one embodiment of the logic associated with processing performed asynchronous to execution of the sampling facility to enable the storing of identifiers with the collected data, in accordance with an aspect of the present invention.

Asynchronous to the above, in accordance with an aspect of the present invention, a dispatcher of the control program issues a Set Program Parameter instruction 700 (FIG. 7A), each time the dispatcher dispatches a task. The Set Program Parameter instruction tags the task with an identifier identifying the specific task. This identifier is provided along with the sample data (e.g., identifier is retrieved from a register and included with data) such that it is known for which task the data belongs. Since the dispatcher is performance critical, there is no test to determine if the measurement facility is activated. Instead, this instruction is issued each time the dispatcher dispatches a task. In one example, if the configuration is not configured for sampling, then the instruction is executed as a no operation.

Figure 7B:
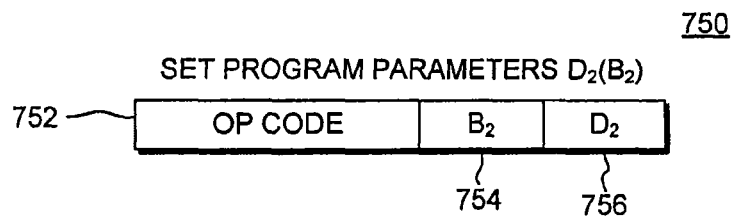
FIG. 7B depicts one example of a format of a Set Program Parameters instruction used in accordance with an aspect of the present invention.

One embodiment of the Set Program Parameter instruction is described with reference to FIG. 7B. As one example, a Set Program Parameter instruction 750 includes the following fields:

Op code 752: This field includes the operation code that specifies the Set Program Parameter instruction;

$B_2$ 754 and $D_2$ 756: The contents of the general register designated by the $B_2$ field are added to the contents of the $D_2$ field to form a second operand address.

In execution, the eight byte program parameter in storage locations designated by the second operand address is placed in a program parameter register. In one example, this register is a 64-bit register, and the contents of this register are cleared to zeros by initial CPU reset, clear reset or power-on reset. As one particular example, the program parameter register is included within a state description maintained in real storage.

Figure 8A:
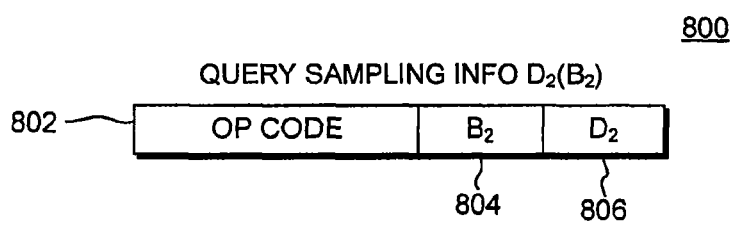
FIG. 8A depicts one embodiment of a format of a Query Sampling Information instruction used in accordance with an aspect of the present invention.

The Query Sampling Information instruction, referred to above, is used to place information about the CPU measurement sampling facility in an information block designated by the second operand address of the instruction. In one example, a Query Sampling Information instruction 800 (FIG. 8A) includes, for instance:

Op code 802: This field includes the operation code that specifies the Query Sampling Information instruction;

$B_2$ 804 and $D_2$ 806: The contents of the general register designated by the $B_2$ field are added to the contents of the $D_2$ field to form a second operand address.

Figure 8B:
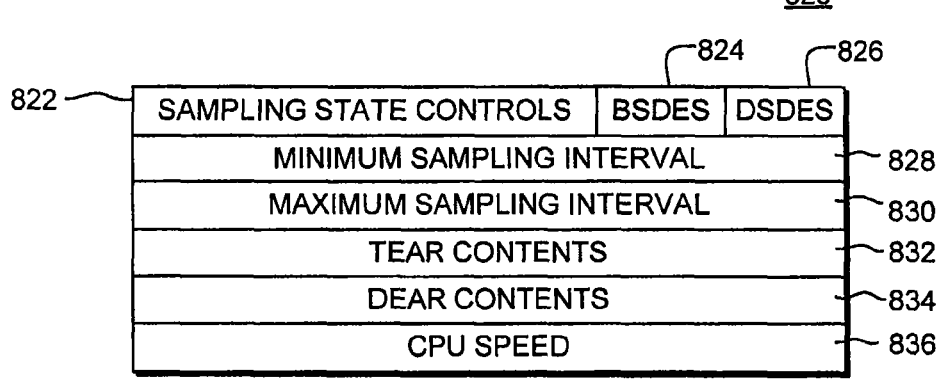
FIG. 8B depicts one embodiment of the fields associated with an information block associated with the Query Sampling Information instruction, in accordance with an aspect of the present invention.

In one example, the information block 820 (FIG. 8B) is 64 bytes and includes the following:

Sampling State Controls 822: Byte offsets 0-3 of the information block include the state controls for the basic sampling and diagnostic sampling functions and have the following format, in one example:

| 0 | 0 | 0 | 0 | 0 | 0 | 0 | 0 | 0 | 0 | 0 | 0 | 0 | 0 | $A_s$ | $A_d$ |
|---|---|---|---|---|---|---|---|---|---|---|---|---|---|---|---|
| 0 | | | | | | | | 8 | | | | | | 14 | 15 |

| 0 | 0 | 0 | 0 | 0 | 0 | $E_s$ | $E_d$ | 0 | 0 | 0 | 0 | 0 | 0 | $C_s$ | $C_d$ |
|---|---|---|---|---|---|---|---|---|---|---|---|---|---|---|---|
| 16 | | | | | | 22 | 23 | | | | | | | 30 | 31 |

$A_s$  Basic sampling authorization control
$A_d$  Diagnostic sampling authorization control
$E_s$  Basic sampling enable control
$E_d$  Diagnostic sample enable control
$C_s$  Basic sampling activation control
$C_d$  Diagnostic sampling activation control Basic Sampling Data Entry Size (BSDES) 824: Byte offsets 4-5 of the information block include an unsigned binary integer, specifying the size in bytes of the basic sampling data entry. This information is hard-coded, in one example, in the machine.

Diagnostic Sampling Data Entry Size (DSDES) 826: Byte offsets 6-7 include an unsigned binary integer, specifying the size in bytes of the diagnostic sampling data entry. This integer is hard-coded, in one example, in the machine.

Minimum Sampling Interval 828: Byte offsets 8-15 of the information block include the minimum sampling interval in number of CPU cycles. This information is hard-coded, in one example, in the machine.

Maximum Sampling Interval 830: Byte offsets 16-23 include the maximum sampling interval in number of CPU cycles. This information is hard-coded, in one example, in the machine.

TEAR Contents 832: When the basic sampling or diagnostic sampling function, or both, are enabled, byte offsets 24-31 of the information block include the contents of the table entry address register. When neither the basic sampling nor diagnostic sampling function is enabled, zeros are stored in byte offsets 24-31 of the information block.

DEAR Contents 834: When the basic sampling or diagnostic sampling function, or both are enabled, byte offsets 32-39 of the information block include the contents of the data entry address register. When neither the basic sampling nor the diagnostic sampling function is enabled, zeros are stored in byte offsets 32-39 of the information block.

CPU Speed 836: Byte offsets 44-47 include an unsigned binary integer, which specifies the CPU speed in number of CPU cycles per microsecond. This information is provided by the machine.

Figure 9A:
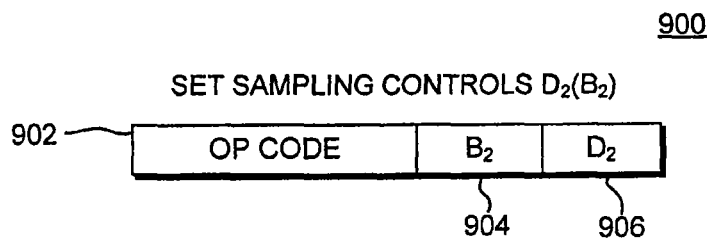
FIG. 9A depicts one embodiment of a format of a Set Sampling Controls instruction used in accordance with an aspect of the present invention.

The Set Sampling Controls instruction, an example of which is described with reference to FIG. 9A, is used to update the sampling controls. In one embodiment, a Set Sampling Controls instruction 900 includes the following format, in one example:

Op Code 902: This field includes the operation code that specifies the Set Sampling Controls instruction;

$B_2$ 904 and $D_2$ 906: The contents of the general register designated by the $B_2$ field are added to the contents of the $D_2$ field to form a second operand address.

During instruction execution, the sampling controls in the request block in storage locations designated by the second operand address are placed in the corresponding sampling control registers. The values of the controls in the request block are provided by the operator and/or the control program, as indicated below.

Figure 9B:
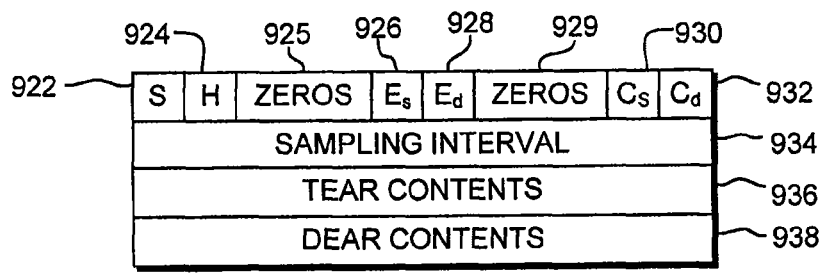
FIG. 9B depicts one embodiment of a request block associated with the Set Sampling Controls instruction, in accordance with an aspect of the present invention.

In one example, the request block is 64 bytes and includes the following fields, as described with reference to FIG. 9B:

S 922: Bit 0, S, of the request block specifies the maximum buffer size indicator, as specified by the operator.

H 924: When the CPU is running at the logical partition level, bit 1, H, of the request block is the host indicator. When the CPU is not running at the logical partition level, bit 1 is ignored and treated as zero. This is specified by the control program.

$E_s$ 926: Bit 54, $E_s$, of the request block specifies the basic sampling enable control, which is set based on an input parameter from the operator;

$E_d$ 928: Bit 55, $E_d$, of the request block specifies the diagnostic sampling enable control, which is set based on an input parameter from the operator.

$C_s$ 930: Bit 62, $C_s$, of the request block specifies the basic sampling activation control, which is set based on an input parameter from the operator.

$C_d$ 932: Bit 63, $C_d$, of the requested block specifies the diagnostic sampling activation control, which is set based on an input parameter from the operator. Bits 2-53 (925) and 56-61 (929) of the request block are zeros.

The specified enable and activation controls of sampling functions are set only if both sampling functions can make a valid state transition. If a sampling function cannot make a valid state transition, the specified state controls are not set for any sampling function.

When a sampling function is set to the active state from the disabled, inactive, or active state, the additional controls, including the maximum buffer size indicator, the host indicator, sampling interval 934, table entry address register contents 936, and the data entry address register contents 938 are placed in the sampling control registers. When no sampling function is placed in the active state by the operation, the additional controls are ignored and are not placed in the sampling control registers.

When a sampling function is to be set to the active state from the disabled, inactive, or active state, and if the requested sampling interval is outside the supported range, no sampling control, including any state control, in the sampling control registers is changed and a specification exception is recognized. The supported sampling interval range is between the maximum and minimum sampling intervals, inclusively, provided by executing the Query Sampling Information instruction.

In one example, when the enable and activation controls for both sampling functions are set, condition code 0 is set. When the enable and activation controls are not set, condition code 3 is set.

Described in detail above is a CPU measurement facility, which periodically takes a snapshot of the central processing unit on which it is executing, and records the CPU state information, including the instructions being executed (e.g., Op codes, whether there is a problem with an instruction, etc.) At each sampling time, the sample data is placed in a buffer. When the buffer has a defined amount of data, an interrupt is presented in order to remove data from the buffer.

In accordance with an aspect of the present invention, a sample mechanism is provided to collect sample data from the machine without frequent intervention from the operating system. The operating system allocates sample data blocks in real storage for the machine to store sample data. When the amount of sample data to be collected is extremely large, an aspect of the present invention allows the operating system to allocate storage for only a fraction of the total sample data. An alert mechanism is provided to allow the operating system to mark a block requesting that the machine generate an alert interruption when this sample will not fit in this sample data block. This allows the operating system to read out sample data blocks that have been filled up by the machine and to release them for machine use. Also, there is a full indication associated with each sample data block. This is used by the machine to tell the operating system that the block has been filled (or almost filled) by the machine. In addition, there is an overflow count associated with each sample data block. This is used to keep track of the number of sample data entries lost because the sample data blocks are full. This provides a hint to the operating system, when overflow occurs, whether the measured data can still be used or the sampling function must be re-executed. Furthermore, to facilitate the operating system to figure out the sampling interval and the amount of storage for sample data blocks, information about the maximum sampling interval, minimum sampling interval, and CPU speed is provided by a query instruction.

In yet a further aspect of the present invention, a technique is provided for deploying one or more aspects of the sampling logic on one or more processing units. One embodiment of the deployment logic is described with reference to FIGS. 10A-10B.

Figure 10A:
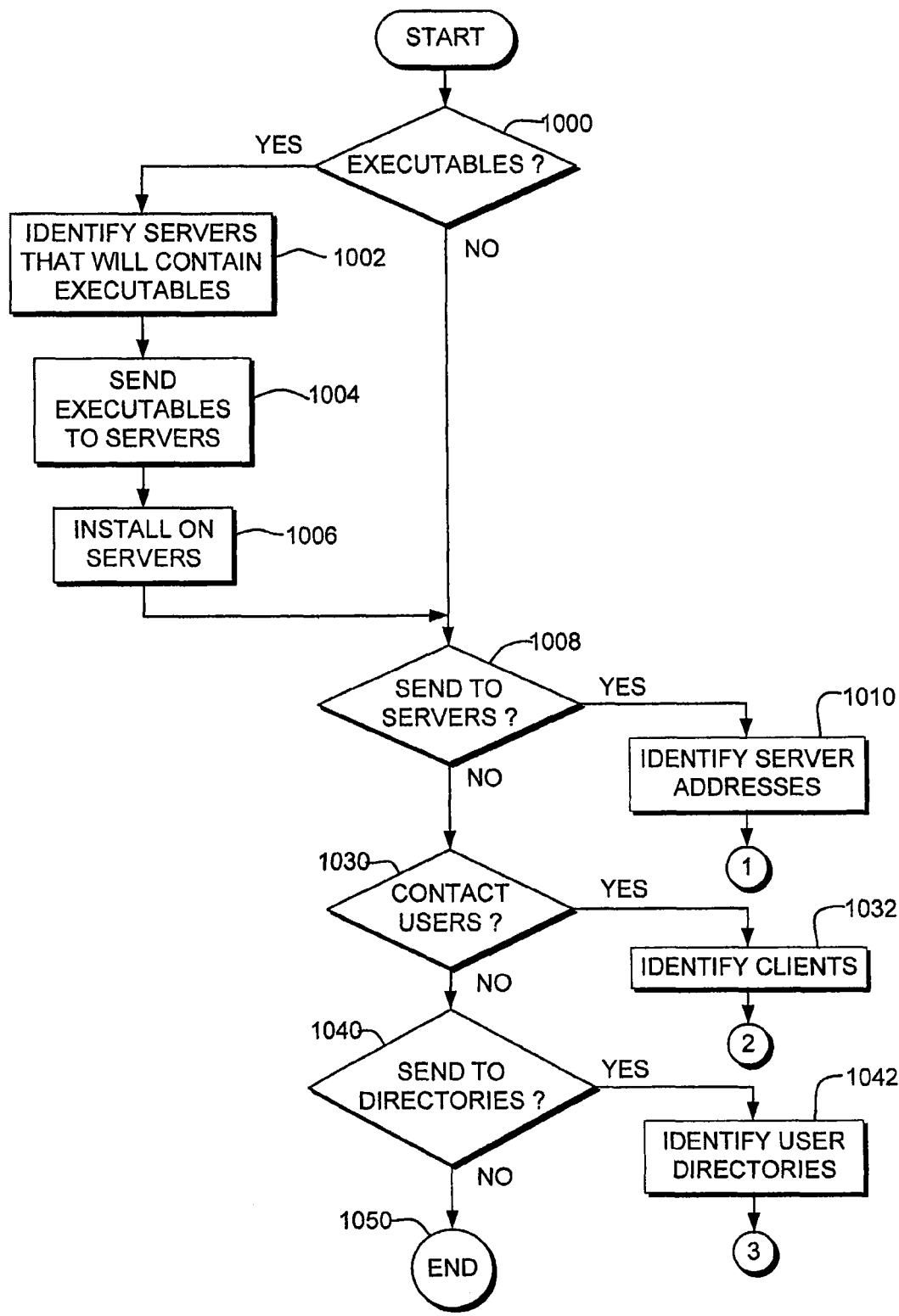
FIGS. 10A-10B depict one embodiment of the logic to deploy sampling logic on one or more processing units, in accordance with an aspect of the present invention.

Referring to FIG. 10A, initially, a determination is made as to whether there are any programs that are to reside on one or more servers when the sampling logic is executed, INQUIRY 1000. If so, then the one or more servers to include the executables are identified, STEP 1002, and the sampling logic for the one or more servers is transferred directly to the servers' storage via, for instance, a File Transfer Protocol (FTP) or some other protocol or by copying through the use of a shared file system, STEP 1004. The logic is then installed on the servers, STEP 1006.

Figure 10B:
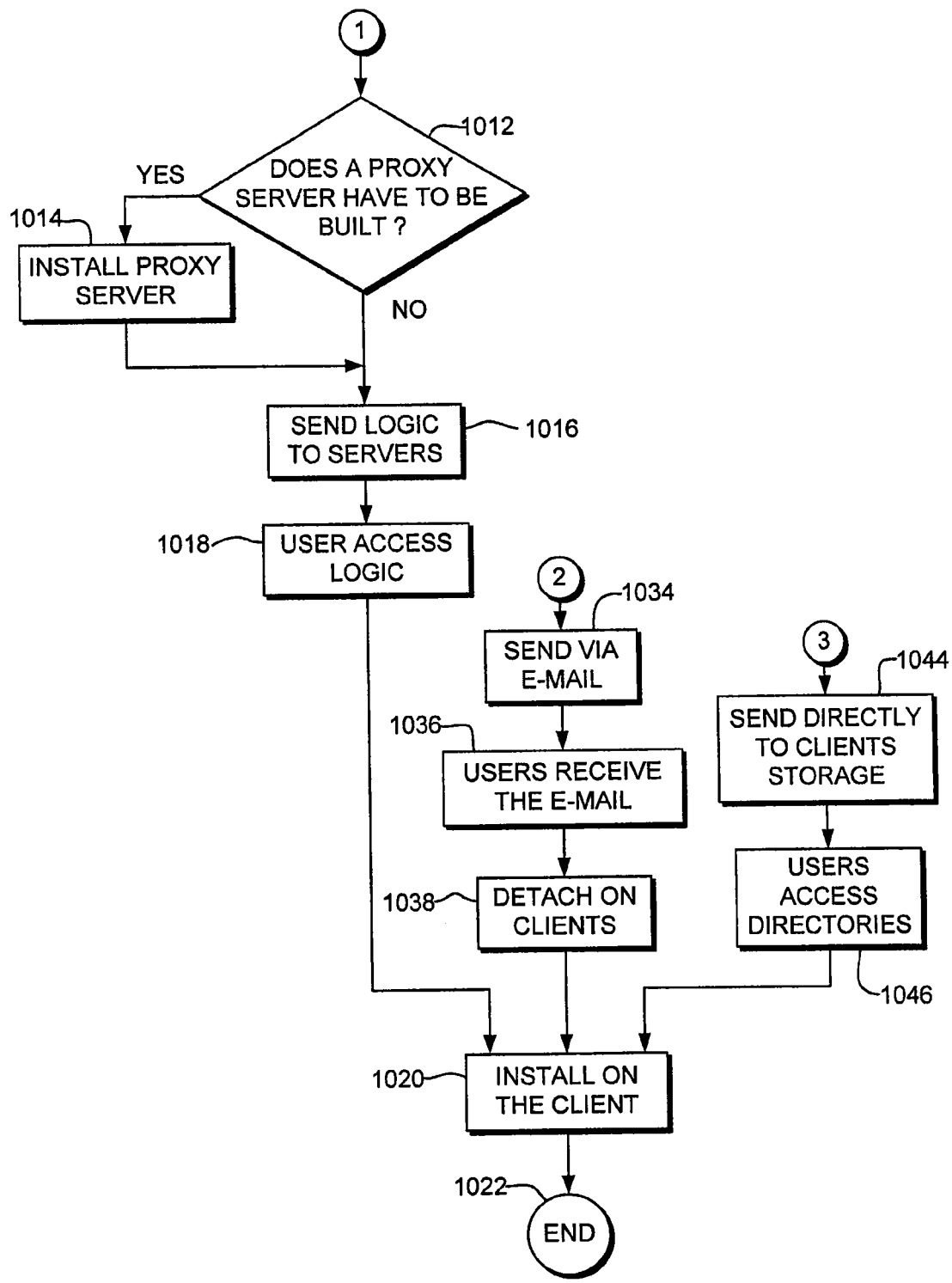

Thereafter, or if there are no executables, a further determination is made as to whether the sampling logic is to be deployed by having users access the logic on a server or servers, INQUIRY 1008. If the users are to access the sampling logic on servers, then the server addresses that are to store the logic are identified, STEP 1010. In one example, a determination is made as to whether a proxy server is to be built to store the sampling logic, INQUIRY 1012 (FIG. 10B). A proxy server is the server that sits between a client application, such as a web browser, and a real server. It intercepts the requests to the real server to see if it can fulfill the request itself. If not, it forwards the request to the real server. Two primary benefits of the proxy server are to improve performance and to filter requests. If a proxy server is to be built, then the proxy server is installed, STEP 1014.

Thereafter, or if a proxy server is not to be built, the sampling logic is sent to the server either via a protocol, such as file transfer protocol (FTP), or it is copied directly from the source files to the server files via file sharing, STEP 1016. As another example, a transaction is sent to the one or more servers that includes the sampling logic and the servers process the transaction, then receive and copy the logic to the servers' file systems.

After the sampling logic is stored at the servers, the users, via their client computers, access the logic on the servers and may copy at least a portion of the logic to their client computers' file systems, STEP 1018. The user then executes the program that installs the logic on the client computer, STEP 1020. In a further example, the servers automatically copy one or more aspects of the sampling logic to each client and then run the installation program for the logic at each client computer. This concludes one example of the deployment processing, STEP 1022.

Returning to INQUIRY 1008 (FIG. 10A), if the logic is not to be deployed by having users access the logic on one or more servers, then processing continues with a determination as to whether the logic is to be deployed by sending the logic to users via e-mail, INQUIRY 1030. If so, the set of users where the logic is to be deployed is identified together with the addresses of the user client computers, STEP 1032. The sampling logic is sent via e-mail to each of the user's client computers, STEP 1034 (FIG. 10B). The users receive the e-mail, STEP 1036, and detach the sampling logic from the e-mail to a directory on their client computers, STEP 1038. The user executes the program that installs the logic on the client computer, STEP 1020, and exits the process, STEP 1022.

Returning to INQUIRY 1030 (FIG. 10A), if the sampling logic is not to be deployed via e-mail, then a further determination is made as to whether the logic is to be sent directly to user directories on their client computers, STEP 1040. If so, the user directories are identified, STEP 1042. The sampling logic is directly transferred to the user's client computer directory, STEP 1044 (FIG. 10B). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the sampling logic, STEP 1046. The user executes the program that installs the logic on the client computer, STEP 1020, and exits the deployment process, STEP 1022.

Returning to INQUIRY 1040 (FIG. 10A), if the logic is not to be sent directly to the users' directories, then processing ends, STEP 1050.

Although an embodiment of deploying logic is provided, many variations can be made without departing from the spirit of the present invention.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention, as described above. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 11:
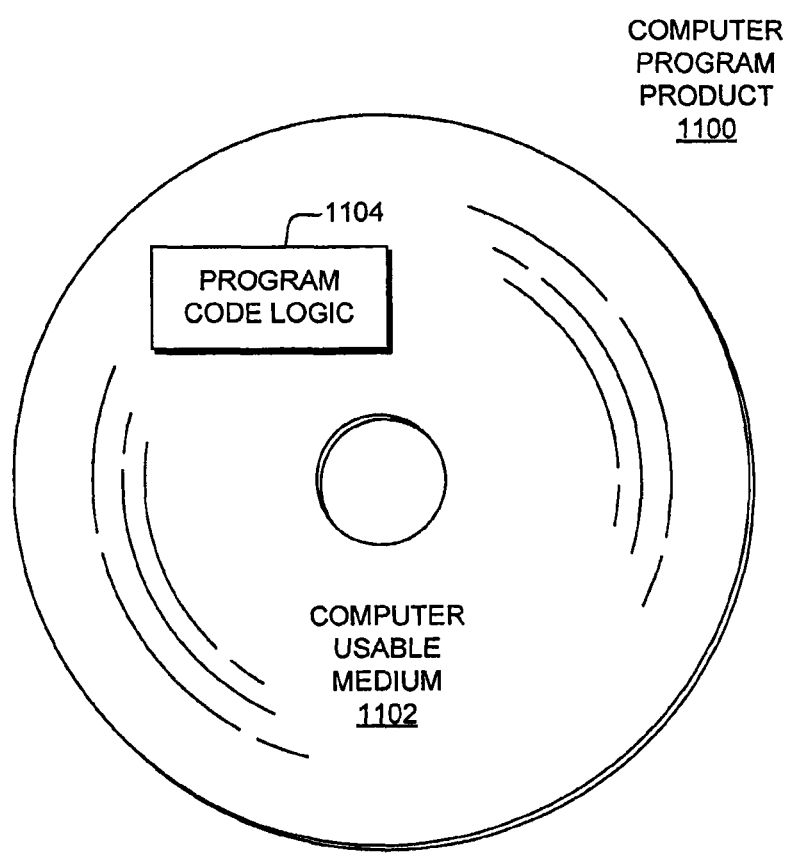
FIG. 11 depicts one embodiment of a computer program product incorporating one or more aspects of the present invention.

One example of an article of manufacture or a computer program product incorporating one or more aspects of the present invention is described with reference to FIG. 11. A computer program product 1100 includes, for instance, one or more computer usable media 1102 to store computer readable program code means or logic 1104 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, the measurement facility of one or more aspects of the present invention does not require an interrupt each time a sampling is performed. Instead, an interrupt is performed only when it is determined that a marked sample data block is approximately full (e.g., not enough space to store next data entry) or at a desired time. By decreasing the number of interrupts, system performance is enhanced. Further, by freeing the buffer, the same buffer is repeatedly used, therefore, decreasing the amount of buffer space needed.

One or more aspects of the present invention allow tradeoffs to be made on how much storage is to be used to create the buffer versus the interrupt frequency. The tradeoff can be based on the sampling interval that is used, the buffer size, the number of samples, and the number of processors participating, as examples.

Although various embodiments are described above, these are only examples. For instance, although various instructions are described herein, one or more aspects of the present invention can use other than instructions, such as commands, functions, etc. Further, the format of the instructions may be different, including different fields, different size fields, different positioning, etc. Yet further, the information of entities (e.g., request blocks, fields of entries, information blocks) described herein can have different information, the size of the fields can be different, as well as the positioning. Reserved fields or those with zeros may have been eliminated from the entities. Moreover, some of the information in the entities may not be used or needed for one or more aspects of the present invention. Many other variations can be made.

Although an example of a processing environment is provided herein, this is only one example. Many other examples of processing environments may incorporate and use one or more aspects of the present invention. For example, a processing environment may have only one CPU or an environment may be provided that is logically partitioned and one or more of the logical partitions is executing a control program. In a further example, a processing environment may be executing different control programs than described herein. Many other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected facilities, such as architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

As used herein, the term obtaining includes, but is not limited to, receiving, being provided, retrieving, determining, accessing, etc.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for executing a machine instruction in a central processing unit of a computing environment, the computer program product comprising:
a non-transitory computer readable storage medium readable by a processing circuit and storing instructions for execution by the processing circuit for performing a method comprising:
obtaining a machine instruction for execution, the machine instruction being defined for computer execution according to a computer architecture, the machine instruction comprising:
an opcode field identifying a set program parameter instruction; and
a first field identifying a general register, the contents of which are added to the contents of a second field to form a second operand address; and
executing the machine instruction, the executing comprising:
responsive to a configuration of the computing environment being configured for sampling to obtain sample data relating to the computing environment, placing a program parameter stored in one or more storage locations designated by the second operand address in a program parameter register, the program parameter register comprising an identifier identifying a task; and
responsive to the configuration not being configured for sampling, executing the machine instruction as a no operation.

2. The computer program product of claim 1, wherein the set program parameter instruction is issued responsive to the task being dispatched, and wherein the set program parameter instruction tags the task with the identifier identifying the task.

3. The computer program product of claim 1, wherein the identifier is provided with sample data, responsive to performing sampling.

4. The computer program product of claim 3, wherein the sample data and the program parameter register comprising the identifier are stored in a sample data block.

5. The computer program product of claim 4, wherein contents of a table entry address register indicate a current entry in the sample data block.

6. The computer program product of claim 5, wherein contents of a data entry address register indicate a next entry in the sample data block.

7. The computer program product of claim 1, wherein the set program parameter instruction is issued asynchronous to issuing an instruction to activate sampling.

8. The computer program product of claim 1, wherein the program parameter is eight bytes and the program parameter register is a 64-bit register.

9. A computer system for executing a machine instruction in a central processing unit of a computing environment, the computer system comprising:
   a memory; and
   a processor in communications with the memory, wherein the computer system is configured to perform a method, said method comprising:
      obtaining a machine instruction for execution, the machine instruction being defined for computer execution according to a computer architecture, the machine instruction comprising:
         an opcode field identifying a set program parameter instruction; and
         a first field identifying a general register, the contents of which are added to the contents of a second field to form a second operand address; and
      executing the machine instruction, the executing comprising:
         responsive to a configuration of the computing environment being configured for sampling to obtain sample data relating to the computing environment, placing a program parameter stored in one or more storage locations designated by the second operand address in a program parameter register, the program parameter register comprising an identifier identifying a task; and
         responsive to the configuration not being configured for sampling, executing the machine instruction as a no operation.

10. The computer system of claim 9, wherein the set program parameter instruction is issued responsive to the task being dispatched, and wherein the set program parameter instruction tags the task with the identifier identifying the task.

11. The computer system of claim 9, wherein the identifier is provided with sample data, responsive to performing sampling.

12. The computer system of claim 9, wherein the sample data and the program parameter register comprising the identifier are stored in a sample data block.

13. The computer system of claim 9, wherein the set program parameter instruction is issued asynchronous to issuing an instruction to activate sampling.

14. The computer system of claim 9, wherein the program parameter is eight bytes and the program parameter register is a 64-bit register.

15. A method of executing a machine instruction in a central processing unit of a computing environment, the method comprising:
   obtaining a machine instruction for execution, the machine instruction being defined for computer execution according to a computer architecture, the machine instruction comprising:
      an opcode field identifying a set program parameter instruction; and
      a first field identifying a general register, the contents of which are added to the contents of a second field to form a second operand address; and
   executing the machine instruction, the executing comprising:
      responsive to a configuration of the computing environment being configured for sampling to obtain sample data relating to the computing environment, placing a program parameter stored in one or more storage locations designated by the second operand address in a program parameter register, the program parameter register comprising an identifier identifying a task; and
      responsive to the configuration not being configured for sampling, executing the machine instruction as a no operation.

16. The method of claim 15, wherein the set program parameter instruction is issued responsive to the task being dispatched, and wherein the set program parameter instruction tags the task with the identifier identifying the task.

17. The method of claim 15, wherein the identifier is provided with sample data, responsive to performing sampling.

18. The method of claim 15, wherein the sample data and the program parameter register comprising the identifier are stored in a sample data block.

19. The method of claim 15, wherein the set program parameter instruction is issued asynchronous to issuing an instruction to activate sampling.

20. The method of claim 15, wherein the program parameter is eight bytes and the program parameter register is a 64-bit register.

* * * * *